(12) United States Patent
Liang et al.

(10) Patent No.: US 12,592,460 B2
(45) Date of Patent: **\*Mar. 31, 2026**

(54) ELECTRODE ASSEMBLY, SECONDARY BATTERY, BATTERY PACK AND DEVICE

(71) Applicant: CONTEMPORARY AMPEREX TECHNOLOGY (HONG KONG) LIMITED, Hong Kong (CN)

(72) Inventors: Chengdu Liang, Ningde City (CN); Qinglin Bai, Ningde City (CN); Yanan Cai, Ningde City (CN); Hongbo Ding, Ningde City (CN)

(73) Assignee: Contemporary Amperex Technology Co., Limited, Ningde City (CN)

( * ) Notice: Subject to any disclaimer, the term of this patent is extended or adjusted under 35 U.S.C. 154(b) by 1101 days.

This patent is subject to a terminal disclaimer.

(21) Appl. No.: 17/586,288

(22) Filed: Jan. 27, 2022

(65) Prior Publication Data

US 2022/0149495 A1     May 12, 2022

Related U.S. Application Data

(63) Continuation of application No. 17/134,248, filed on Dec. 25, 2020, now Pat. No. 11,264,683, which is a
(Continued)

(30) Foreign Application Priority Data

Apr. 30, 2020     (CN) .......................... 202020713877.6

(51) Int. Cl.
    *H01M 50/586*          (2021.01)
    *H01M 10/04*           (2006.01)
    (Continued)

(52) U.S. Cl.
    CPC ..... *H01M 50/586* (2021.01); *H01M 10/0431* (2013.01); *H01M 50/147* (2021.01);
    (Continued)

(58) Field of Classification Search
    None
    See application file for complete search history.

(56) References Cited

U.S. PATENT DOCUMENTS

2009/0061293 A1*  3/2009  Webber ................. H01M 6/164
                                                          429/339
2009/0305122 A1*  12/2009  Mitani ................ H01M 50/171
                                                          429/94

FOREIGN PATENT DOCUMENTS

CN          206134853 U      4/2017
CN          208111561 U      11/2018
                (Continued)

OTHER PUBLICATIONS

European Patent Office, Examination Report for the application No. EP 20811953.7, dated Jul. 15, 2022, 4 pages.
(Continued)

*Primary Examiner* — Haixia Zhang
(74) *Attorney, Agent, or Firm* — Haverstock & Owens, A Law Corporation

(57)     ABSTRACT

Embodiments of the present disclosure relates to an electrode assembly, a secondary battery, a battery pack and a device. The electrode assembly includes: an electrode unit including an electrode body and an electrode terminal part electrically connected with the electrode body; and a first insulating film for being wound around the electrode unit, the first insulating film including a connection part and an extension part connected with each other, the connection part being provided with an adhesive area for connecting with the electrode terminal part, the extension part being a part of the first insulating film extending beyond an end face of the electrode terminal part, and at least part of the extension part being provided as a non-adhesive area.

4 Claims, 9 Drawing Sheets

Related U.S. Application Data continuation of application No. PCT/CN2020/110829, filed on Aug. 24, 2020.

(51) Int. Cl.

| | | |
|---|---|---|
| *H01M 50/147* | (2021.01) | |
| *H01M 50/463* | (2021.01) | |
| *H01M 50/547* | (2021.01) | |

(52) U.S. Cl.
CPC ....... *H01M 50/463* (2021.01); *H01M 50/547* (2021.01); *H01M 2220/20* (2013.01)

(56) References Cited

FOREIGN PATENT DOCUMENTS

| | | | |
|---|---|---|---|
| CN | 208284579 | U | 12/2018 |
| CN | 208955128 | U | 6/2019 |
| CN | 209822798 | U | 12/2019 |
| JP | 2004030938 | A | 1/2004 |
| JP | 2005116435 | A | 4/2005 |
| JP | 2008108743 | A | 5/2008 |
| KR | 20090127076 | A | 12/2009 |
| KR | 20200027337 | A | 3/2020 |

OTHER PUBLICATIONS

The Korean Intellectual Property Office, "Notice of Allowance" in Korean Patent Application No. 10-2021-7031109, dated Oct. 27, 2023, 5 pages.

European Patent Office, extended European search report for the application No. EP 20811953.7, dated Oct. 15, 2021, 16 pages.

European Patent Office, Examination Report for the application No. EP 20811953.7, dated Mar. 21, 2022, 5 pages.

International Searching Authority, International Search Report for the application No. PCT/CN2020/110829, dated Feb. 3, 2021, 11 pages.

Japan Patent Office, Notice of Reasons for Refusal for Japanese Patent Application No. 2021-547264, dated Sep. 4, 2022, 8 pages.

* cited by examiner

ELECTRODE ASSEMBLY, SECONDARY BATTERY, BATTERY PACK AND DEVICE

CROSS REFERENCE

The present disclosure is a continuation of U.S. patent application Ser. No. 17/134,248, filed on Dec. 25, 2020, which is a continuation of International Application No. PCT/CN2020/110829, filed on Aug. 24, 2020, which claims priority to Chinese Patent Application No. 202020713877.6, entitled "Electrode Assembly, Secondary Battery, Battery Pack and Device", filed on Apr. 30, 2020, the entire contents of which are hereby incorporated by reference for all purposes as if fully set forth herein.

TECHNICAL FIELD

The present disclosure relates to the technical field of energy storage equipment, and in particular to an electrode assembly, a secondary battery, a battery pack and a device.

BACKGROUND

With an improvement of technology of an electric vehicle, the electric vehicle is getting closer and closer to people's lives. At the same time, a requirements for performance of an energy-providing battery in the electric vehicle is higher and higher.

In a prior cylindrical secondary battery, after a tab part is flattened, the tab part may overlap with a housing of the secondary battery, which affects safety performance of the secondary battery.

Therefore, there is an urgent need for a new electrode assembly, secondary battery, battery pack and device.

SUMMARY

The present disclosure provides an electrode assembly, a secondary battery, a battery pack and a device to improve safety performance of the electrode assembly.

An embodiment of the present disclosure in a first aspect provides an electrode assembly for a secondary battery, the electrode assembly comprising: an electrode unit comprising an electrode body and an electrode terminal part electrically connected with the electrode body; and a first insulating film for being wound around the electrode unit, the first insulating film comprising a connection part and an extension part connected with each other, the connection part being provided with an adhesive area for connecting with the electrode terminal part, the extension part being a part of the first insulating film extending beyond an end face of the electrode terminal part, and at least part of the extension part being provided as a non-adhesive area.

According to an embodiment of the present disclosure in the first aspect, the non-adhesive area covers the extension part.

In an embodiment, the non-adhesive area extends from the extension part to the connection part.

In an embodiment, the connection part comprises a first portion and a second portion connected with each other, the first portion is used to cover an outer peripheral surface of the electrode terminal part, the second portion is used to cover at least a part of an outer peripheral surface of the electrode body, and each of the first portion and the second portion is provided with the adhesive area.

In an embodiment, the second portion completely covers the outer peripheral surface of the electrode body.

According to an embodiment of the present disclosure in the first aspect, a second insulating film is further comprised for being wound around an outer peripheral surface of the electrode body, a surface of the second insulating film is provided with adhesive glue, and the second insulating film extends to an outer periphery of the electrode terminal part and does not extend beyond the end face of the electrode terminal part.

In an embodiment, the second insulating film is partially laminated with the first insulating film.

An embodiment of the present disclosure in a second aspect provides a secondary battery, comprising: a housing with an opening; an end cover for covering the opening and enclosing an accommodation space with the housing; and the electrode assembly as described above located in the accommodation space.

According to an embodiment of the present disclosure in the second aspect, a separator is provided on a side of the end cover facing the electrode assembly, the separator comprises a side wall and a receiving space enclosed by the side wall, and the extension part is located in the receiving space.

An embodiment of the present disclosure in a third aspect provides a battery pack comprising a case and a plurality of secondary batteries as described above, wherein the plurality of secondary batteries are accommodated in the case.

In another aspect, an embodiment of the present disclosure in a fourth aspect provides a device comprising the secondary battery as described above, the secondary battery being used to provide electrical energy.

In the electrode assembly of the embodiment of the present disclosure, the electrode assembly comprises the electrode unit and the first insulating film wound around the electrode unit. The first insulating film is wound around the electrode unit to ensure mutual insulation between the electrode assembly and the housing of the secondary battery. The first insulating film comprises a connection part and an extension part. The adhesive area is provided on the connection part to ensure stability of a relative position between the connection part and the electrode terminal part, and ensure that the electrode assembly and the housing of the secondary battery are mutually insulated. At least part of the extension part is the non-adhesive area. That is, at least part of the extension part does not have adhesiveness. When the extension part and the electrode terminal part are in contact with each other, if the extension part is tilted, a part of the electrode terminal part can be prevented from being lifted up by the extension part. Therefore the electrode terminal part and a top cover of the secondary battery is prevented from contacting each other, and safety performance of the electrode assembly is improved.

BRIEF DESCRIPTION OF THE DRAWINGS

Below, by reading a detailed description of non-limiting embodiments with reference to drawings, other features, purposes and advantages of the present disclosure will become more apparent, wherein the same or similar reference signs represent the same or similar features.

DESCRIPTION OF REFERENCE SIGNS

Figure 1:
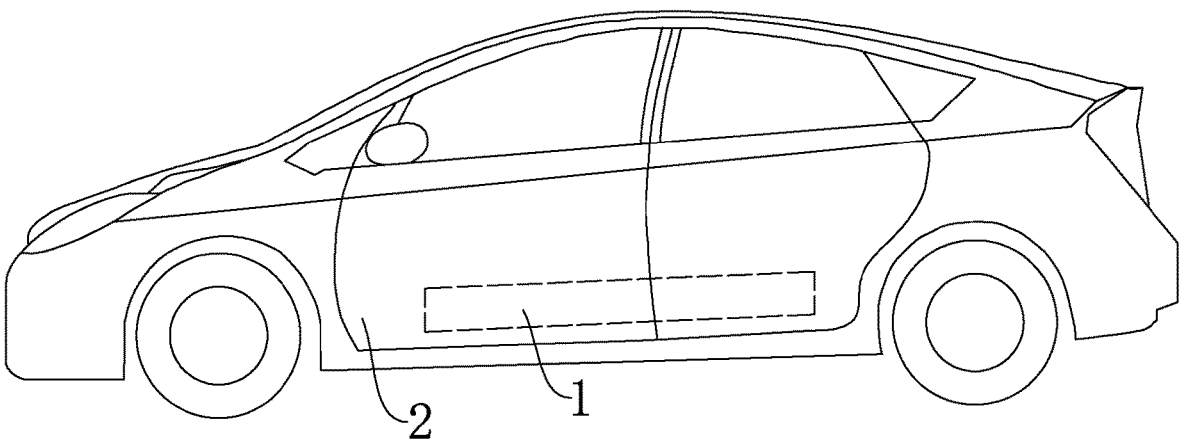
FIG. 1 is a schematic structural view of a vehicle provided by an embodiment of the present disclosure.

1. Battery pack; 11. Battery module; 12. Case; 2. Vehicle body;
10. Secondary battery; 20. Receptacle;
100. Electrode assembly;
110. Electrode unit; 111, Electrode body; 112, Electrode terminal part; 112a, End face;
120. First insulating film; 121, Connection part; 121a, First portion; 121b, Second portion; 122, Extension part; 123, Adhesive layer; 124, Substrate;
130. Second insulating film;
200. Housing;
300. End cover;
400. Separator; 410. Side part; 420. Receiving space.

DETAILED DESCRIPTION

Embodiments of the present disclosure will be described further in detail below with reference to drawings and embodiments. In the following detailed description, many specific details are proposed in order to provide a comprehensive understanding of the present disclosure. However, it is obvious to those skilled in the art that the present disclosure can be implemented without some of these specific details. The following description of embodiments is only to provide a better understanding of the present disclosure by showing examples of the present disclosure. In the drawings and the following description, at least part of well-known structures and technologies are not shown in order to avoid unnecessarily obscuring the present disclosure; for clarity, the size of some structures may be exaggerated. In addition, features, structures or characteristics described below may be combined in one or more embodiments in any suitable manner.

In the description of the present disclosure, it should be noted that, unless otherwise stated, the meaning of "a plurality of" or the like is two or more; the terms "upper", "lower", "left", "right", "inner" and "outer", etc. indicating the directions or positional relationships are only for the convenience of describing the present disclosure and simplifying the description, do not indicate or imply that the device or element referred to must have a specific orientation, to be configured and operated in a specific orientation, and cannot be understood as a limitation on the present disclosure. The orientation words appearing in the following description are all directions shown in drawings, and do not limit a specific structure of embodiments of the present disclosure. In the description of the present disclosure, it should also be noted that the terms "install", "connect", or the like should be understood in a broad sense unless otherwise specified and limited. For example, it may be a fixed connection or a detachable connection, or an integral connection; it can be a direct connection or indirect connection. For those of ordinary skill in the art, specific meanings of the above terms in the present disclosure may be understood according to specific situations.

In a prior cylindrical secondary battery, the secondary battery includes an electrode unit. The electrode unit includes an electrode body and an electrode terminal for electrically connecting with the electrode body. The electrode terminal is located on a side of the electrode body, and the electrode terminal needs to be flattened to form an electrode terminal part. In order to avoid overlapping of the electrode terminal part and a housing of the secondary battery, it is necessary to wrap a first insulating film on an outer peripheral surface of the electrode terminal part. In order to improve stability of mutual insulation between the electrode terminal part and the housing, an edge of the first insulating film needs to be beyond an end face of the electrode terminal part by a certain height.

During a manufacturing process of the secondary battery or during use of the secondary battery, a portion of the first insulating film extending beyond the end face of the electrode terminal part is folded down and adhered to the end face of the electrode terminal part. When the portion of the first insulating film that is beyond the electrode terminal part is erected again and separated from the end face of the electrode terminal part, part of an edge of the electrode terminal part may be brought up, and there is a risk that the electrode terminal part overlaps the housing or the top cover.

In order to solve the above problem and improve safety performance of the secondary battery, the present disclosure is provided.

In order to provide a better understanding of the present disclosure, the electrode assembly, the secondary battery, the battery pack and the device according to the embodiments of the present application will be described in detail below with reference to FIGS. 1 to 18.

As shown in FIG. 1, an embodiment of the present disclosure first provides a vehicle. The vehicle includes a battery pack 1 and a vehicle body 2, and the battery pack 1 is disposed on the vehicle body 2.

The vehicle is a new energy vehicle, which can be a pure electric vehicle, a hybrid vehicle or an extended-range vehicle. The vehicle body 2 is provided with a driving motor. The driving motor is electrically connected with the battery pack 1, and the battery pack 1 provides electric energy. The driving motor is connected with wheels on the vehicle body 2 via a transmission mechanism to drive the vehicle. The battery pack 1 may be horizontally arranged in the bottom of the vehicle body 2.

Figure 2:
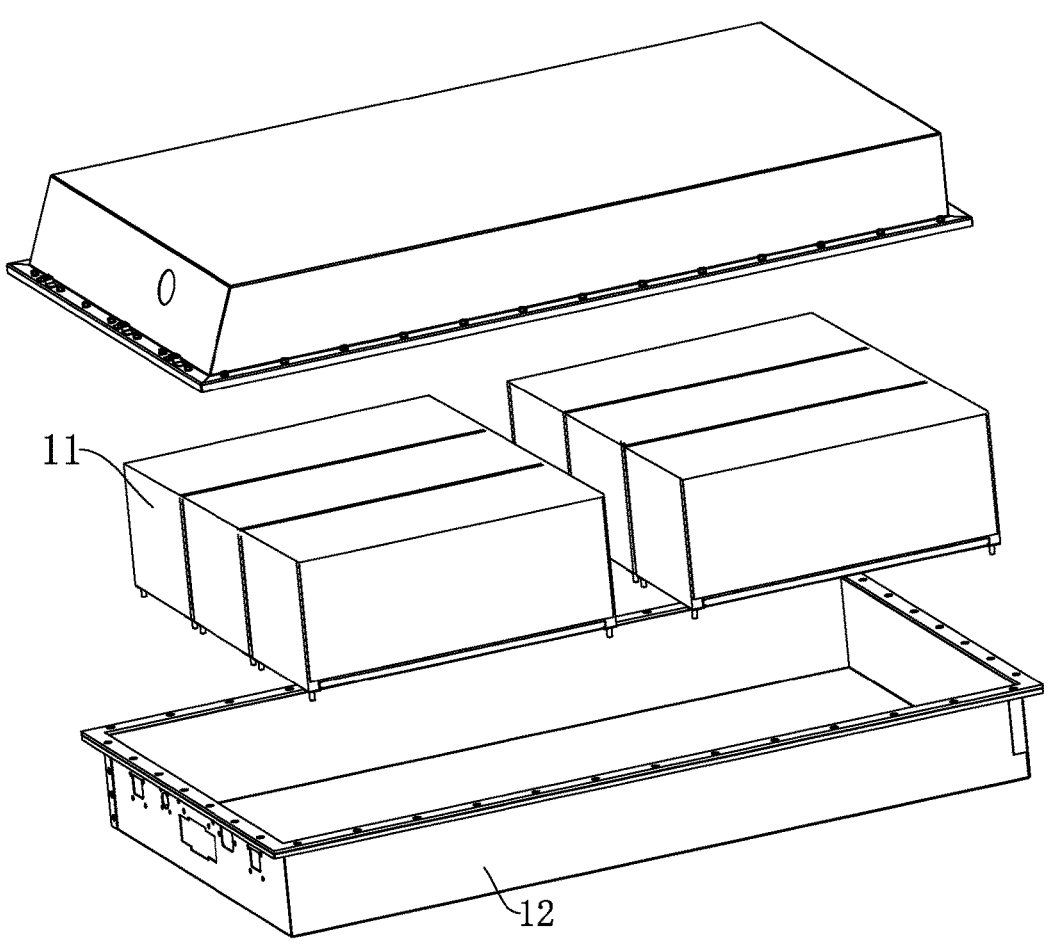
FIG. 2 is a schematic structural view of a battery pack provided by an embodiment of the present disclosure.

Please also refer to FIG. 2. The battery pack 1 may have various arrangements. In some optional embodiments, the battery pack 1 includes a case 12 and a battery module 11 arranged in the case 12.

The number of battery module(s) 11 is one or more, and a plurality of battery modules 11 are arranged in a row in the case 12. The type of the case 12 is not limited, and the case 12 may be a frame-shaped case, a disk-shaped case, or a box-shaped case. The case 12 may include a lower case for accommodating the battery module and an upper case covering the lower case.

Figure 3:
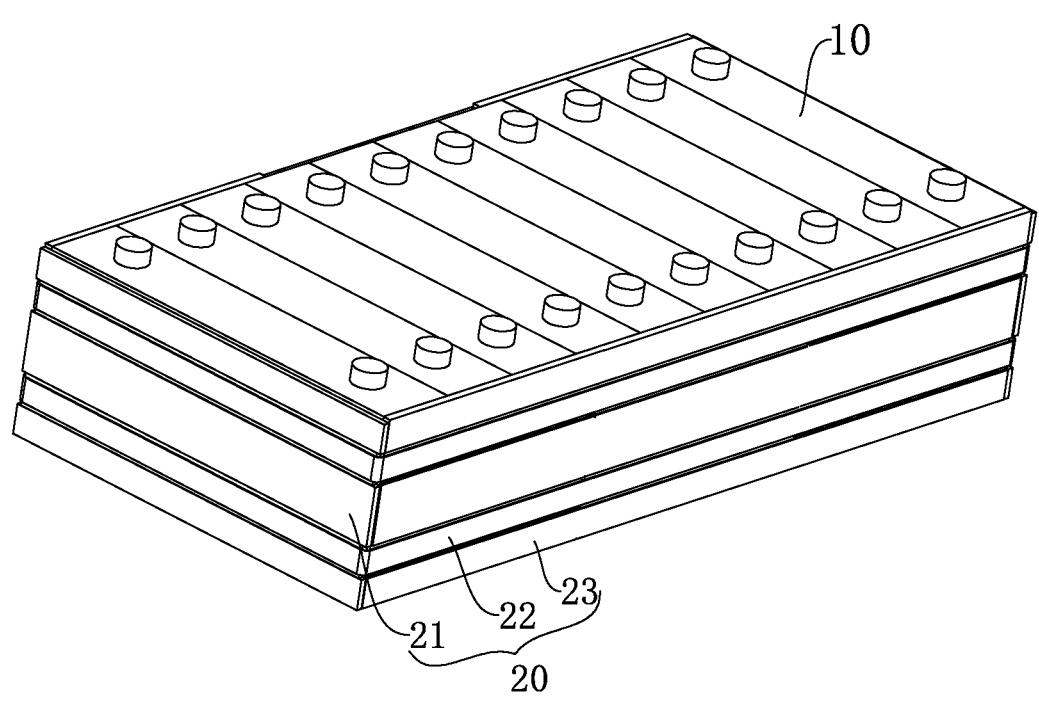
FIG. 3 is a schematic structural view of a battery module provided by an embodiment of the present disclosure.

Please also refer to FIG. 3, and the battery module 11 may have various arrangements. In some optional embodiments, the battery module 11 includes a receptacle 20 and a plurality of secondary batteries 10 located in the receptacle 20, and the secondary batteries 10 are arranged side by side in the receptacle 20.

The receptacle 20 can be arranged in various ways. For example, the receptacle 20 includes a housing and a cover plate covering the housing; or the receptacle 20 includes side plates 22 and end plates 21 that are connected with each other to form an enclosed space; or the receptacle includes end plates 21 oppositely arranged and a band 23 around the end plates 21 and the secondary battery.

The secondary battery 10 can be used not only in the vehicle but also in other devices. An embodiment of the present disclosure also provides a device that uses the secondary battery 10 as a power source. The device can be, but is not limited to, a vehicle, a ship, or an aircraft.

The secondary battery 10 may have various arrangements. The secondary battery 10 is, for example, a cylindrical secondary battery 10, or the secondary battery 10 is a prismatic secondary battery 10. An embodiment of the present disclosure takes the cylindrical secondary battery 10 as an example for description.

Figure 4:
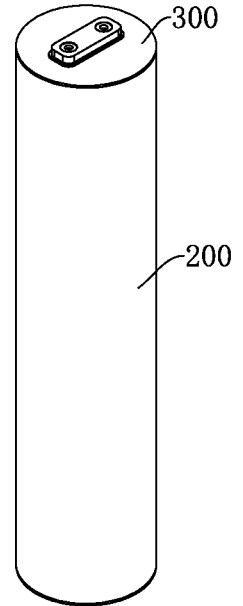
FIG. 4 is a schematic structural view of a secondary battery provided by an embodiment of the present disclosure.
Figure 5:
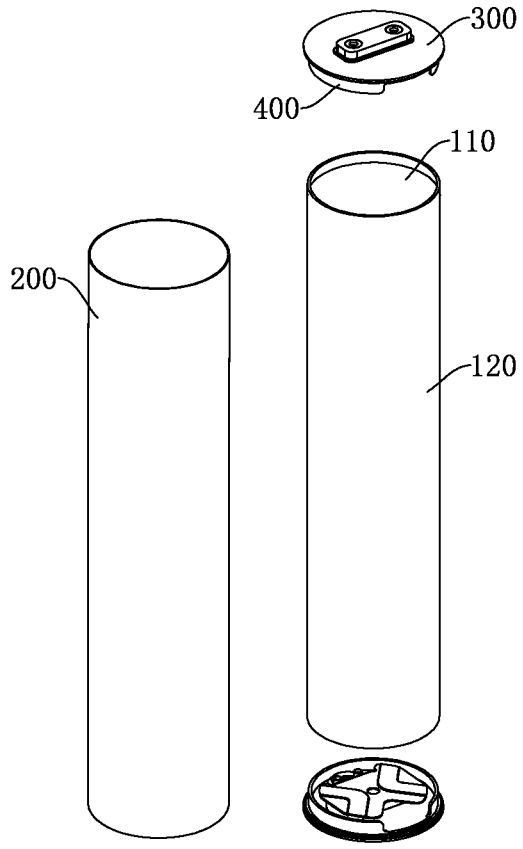
FIG. 5 is a schematic exploded structural view of FIG. 4.

Please refer to FIGS. 4 and 5 together. FIG. 4 is an isometric view of a secondary battery 10 according to an embodiment of the present disclosure. FIG. 5 is a schematic exploded structural view of FIG. 4.

In some optional embodiments, the secondary battery 10 includes a housing 200 with an opening; an end cover 300 for covering the opening of the housing 200 and encloses an accommodation space with the housing; and the electrode assembly 100 is located in the accommodation space.

Figure 6:
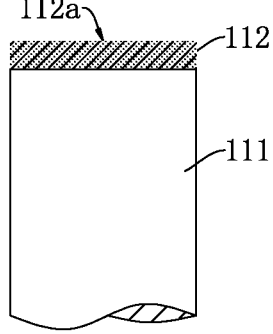
FIG. 6 is a schematic structural diagram of an electrode unit in a secondary battery provided by an embodiment of the present disclosure.

The electrode assembly 100 may have various arrangements. Please also refer to FIG. 6. FIG. 6 is a schematic structural view of an electrode unit 110 in the secondary battery 10 provided by an embodiment of the present disclosure. In some optional embodiments, the electrode assembly 100 includes the electrode unit 110, and the electrode unit 110 includes an electrode body 111 and an electrode terminal part 112 for electrically connecting with the electrode body 111.

Figure 7:
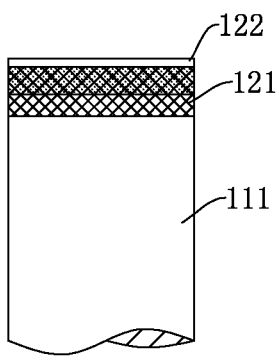
FIG. 7 is a schematic partial structural view of an electrode assembly provided by an embodiment of the present disclosure.

In some optional embodiments, reference can also be made to FIG. 7. FIG. 7 is a schematic partial structural view of an electrode assembly 100 in the secondary battery 10 provided by an embodiment of the present disclosure. The electrode assembly 100 further includes a first insulating film 120. The first insulating film 120 includes a connection part 121 and an extension part 122 connected with each other. The connection part 121 is provided with an adhesive area for connecting with the electrode terminal part 112. The extension part 122 is a portion of the first insulating film 120 that is beyond an end face 112*a* of the electrode terminal part 112, and at least part of the extension portion 122 is provided as a non-adhesive area.

The adhesive area refers to an area having adhesiveness, and the first insulating film 120 can be adhered to the electrode terminal part 112 via the adhesive area. The non-adhesive area refers to an area not having adhesiveness, and the non-adhesive area will not be adhered to the electrode unit 110.

In the electrode assembly 100 of the embodiment of the present disclosure, the electrode assembly 100 includes the electrode unit 110 and the first insulating film 120 wound around the electrode unit 110. The first insulating film 120 is wound around outside of the electrode unit 110 to ensure mutual insulation between the electrode assembly 100 and the housing 200 of the secondary battery 10. The first insulating film 120 includes the connection part 121 and the extension part 122. The adhesive area provided on the connection part 121 can ensure stability of a relative position between the connection part 121 and the electrode terminal part 112, and ensure a mutual insulation between the electrode assembly 100 and the housing 200 of the secondary battery 10. At least part of the extension part 122 is the non-adhesive area. That is, at least part of the extension part 122 do not have adhesiveness. When the extension part 122 and the electrode terminal part 112 are in contact with each other, if the extension portion 122 is tilted, the extension part 122 can be prevented from lifting up part of the electrode terminal part 112. Therefore, the electrode terminal part 112 and a top cover of the secondary battery 10 are prevented from contacting with each other, and safety performance of the electrode assembly 100 is improved.

Figure 8:
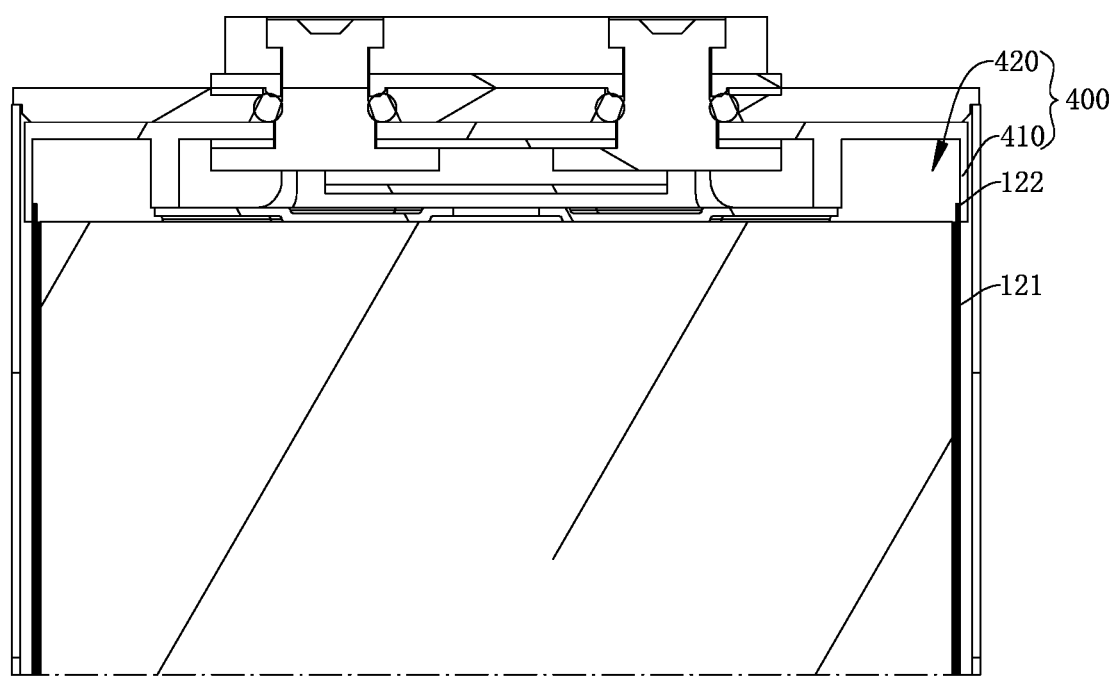
FIG. 8 is a partial cross-sectional view of a secondary battery provided by an embodiment of the present disclosure.

Please also refer to FIG. 8. FIG. 8 is a partial cross-sectional view of a secondary battery 10 according to an embodiment of the present disclosure. In some optional embodiments, the secondary battery 10 further includes a separator 400. The separator 400 is provided on a side of the end cover 300 facing the electrode assembly 100. The separator 400 can ensure that the electrode terminal 112 and the end cover 300 are insulated from each other.

The separator 400 may have various arrangements. In some optional embodiments, the separator 400 includes a side part 410 and a receiving space 420 enclosed by the side part 410, and the extension part 122 is located in the receiving space 420.

In these optional embodiments, the separator 400 is located between the end cover 300 and the electrode terminal part 112, and the extension part 122 of the first insulating film 120 extends beyond the end face 112*a* of the electrode terminal part 112. The extension part 122 is located in the receiving space 420, so that a gap is prevented from forming between the first insulating film 120 and the separator 400, the electrode terminal part 112 contacting the housing 200 or the end cover 300 via the gap is prevented, and safety performance of the electrode assembly 100 can be further improved.

Figure 9:
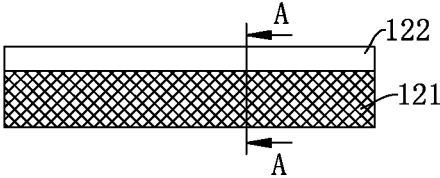
FIG. 9 is a schematic structural view of a first insulating film of an electrode assembly provided by an embodiment of the present disclosure.
Figure 10:
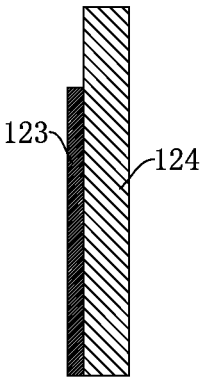
FIG. 10 is a cross-sectional view at A-A in FIG. 9.

Please refer to FIGS. 9 and 10 together. FIG. 9 is a schematic structural view of a first insulating film 120 provided by an embodiment of the present disclosure. In FIG. 9, the first insulating film 120 is in a flat state. FIG. 10 is a cross-sectional view at A-A in FIG. 9.

The non-adhesive area may have various arrangements. For example, an adhesive layer 123 is provided on the extension part 122, and an insulating layer is pasted on the adhesive layer 123 so that the part of the adhesive layer 123 does not have adhesiveness, thereby forming the non-adhesive area.

In other optional embodiments, as shown in FIG. 10, the first insulating film 120 includes a substrate 124, and the adhesive layer 123 is provided on a portion of the substrate 124 to form the adhesive area. At least a portion of the substrate 124 corresponding to the extension part 122 is not provided with the adhesive layer 123 to form the non-adhesive area. In FIG. 10, an area where the adhesive layer 123 is provided is the adhesive area, and an area where the adhesive layer 123 is not provided is the non-adhesive area.

Various materials can be used for the substrate 124. For example, the material of the substrate 124 may be polyvinyl chloride, PET or the like. Various materials can be used for the adhesive layer 123. For example, the material of the adhesive layer 123 can be acrylic, rubber, or the like.

Figure 11:
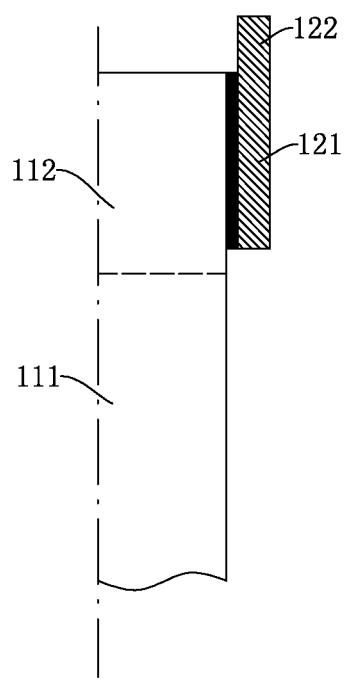
FIG. 11 is a partial cross-sectional view of an electrode assembly provided by an embodiment of the present disclosure.
Figure 12:
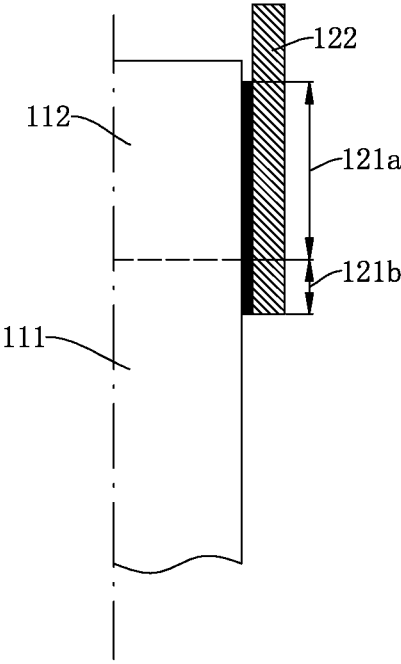
FIG. 12 is a partial cross-sectional view of an electrode assembly provided by another embodiment of the present disclosure.

The non-adhesive area may be arranged in different positions. In some optional embodiments, reference can be made to FIGS. 11 and 12 together. FIG. 11 is a partial cross-sectional view of an electrode assembly 100 provided by an embodiment of the present disclosure. FIG. 12 is a partial cross-sectional view of an electrode assembly 100 according to another embodiment of the present disclosure. In FIG. 11, a dividing line between the electrode body 111 and the electrode terminal part 112 is shown by a dotted line, and the dotted line does not constitute a limitation on the structure of the present disclosure. Moreover, only a part of the structure of the electrode unit 110 is shown in FIG. 11.

The non-adhesive area covers the extension part 122. In some optional embodiments, the non-adhesive area may cover only the extension part 122; alternatively as shown in FIG. 12, the non-adhesive area extends from the extension part 122 to the connection part 121.

In these optional embodiments, the non-adhesive area covers the extension part 122. That is, a portion of the first insulating film 120 that extends beyond the end face 112a of the electrode terminal part 112 is set as the non-adhesive area which does not have adhesiveness and whereby the extension part 122 and the end face 112a of the electrode terminal part 112 can be prevented from adhering to each other to further improve safety performance of the electrode assembly 100.

Figure 13:
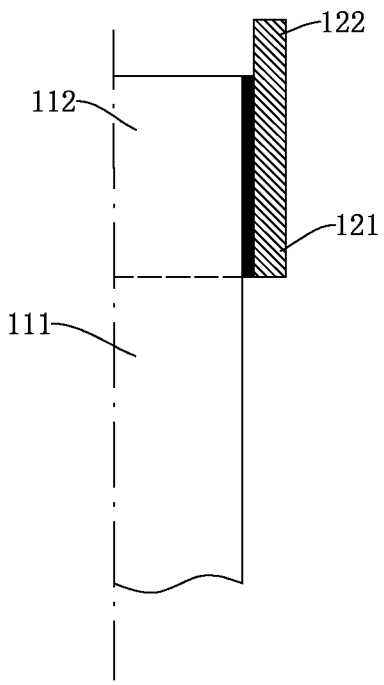
FIG. 13 is a partial cross-sectional view of an electrode assembly according to still another embodiment of the present disclosure.
Figure 14:
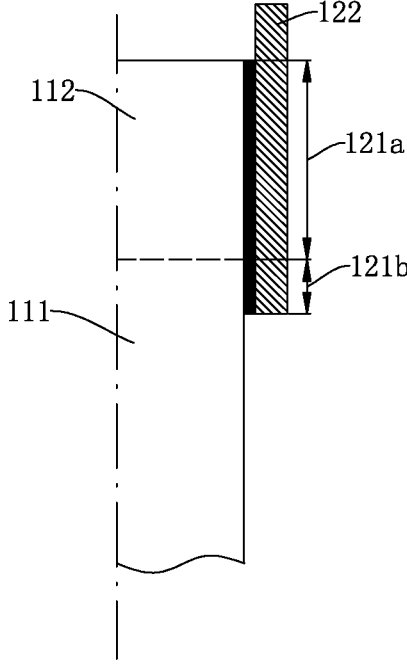
FIG. 14 is a partial cross-sectional view of an electrode assembly provided by still another embodiment of the present disclosure.

The connection part 121 may have various arrangements, and the connection part 121 may cover part or all of an outer peripheral surface of the electrode terminal part 112. Please refer to FIGS. 13 and 14 together. FIG. 13 is a partial cross-sectional view of an electrode assembly 100 according to an embodiment of the present disclosure. FIG. 14 is a partial cross-sectional view of an electrode assembly 100 according to another embodiment of the present disclosure.

In some optional embodiments, the connection part 121 includes a first portion 121a and a second portion 121b connected with each other. The first portion 121a is used to cover the outer peripheral surface of the electrode terminal part 112, and the second portion 121b is used to cover at least a portion of the outer peripheral surface of the electrode body 111, and the first portion 121a and the second portion 121b are both set as adhesive areas.

In these optional embodiments, the connection part 121 includes a first portion 121a and a second portion 121b, and the second portion 121b extends to the electrode body 111, which can both ensure that the first insulating film 120 can completely cover the outer peripheral surface of the electrode terminal part 112, and that the first insulating film 120 can also provide protection to the electrode body 111 to further improve safety performance of the electrode assembly 100.

Figure 15:
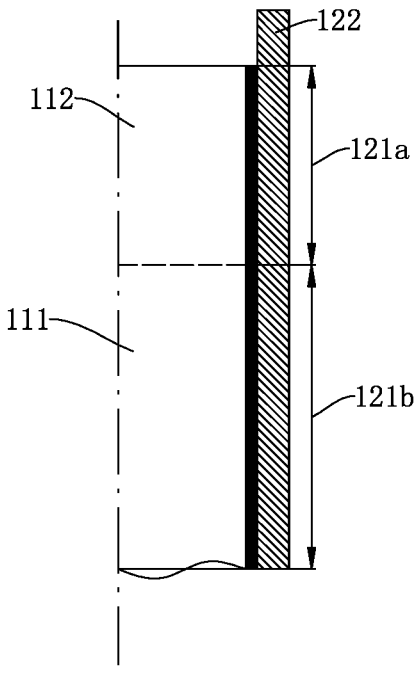
FIG. 15 is a partial cross-sectional view of an electrode assembly provided by another embodiment of the present disclosure.

Please also refer to FIG. 15. In some optional embodiments, the second portion 121b completely covers the outer peripheral surface of the electrode body 111. In these optional embodiments, the first insulating film 120 can not only completely cover the electrode terminal part 112, but also completely cover the electrode body 111, and there is no need to repeatedly provide an insulating layer outside the electrode body 111. Without affecting safety performance of the electrode assembly 100, a structure of the electrode assembly 100 can be simplified, and forming steps of the electrode assembly 100 can also be simplified.

Figure 16:
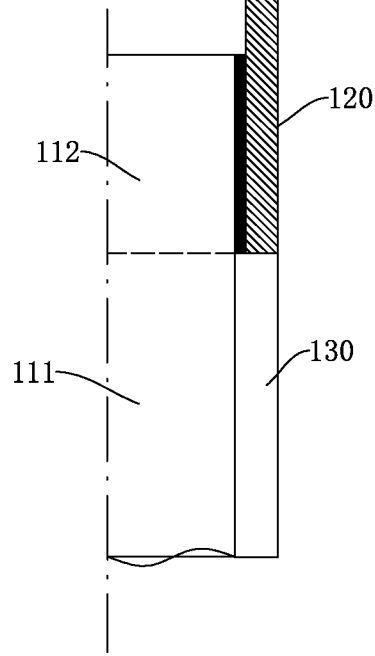
FIG. 16 is a partial cross-sectional view of an electrode assembly provided by another embodiment of the present disclosure.
Figure 17:
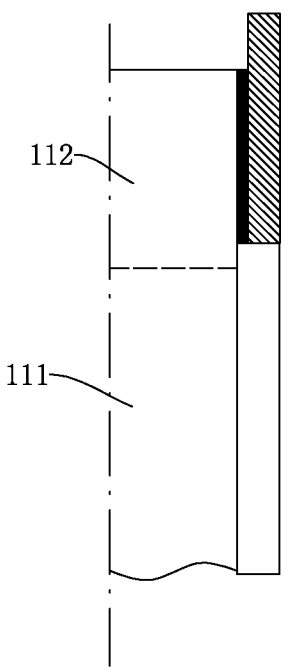
FIG. 17 is a partial cross-sectional view of an electrode assembly according to another embodiment of the present disclosure.
Figure 18:
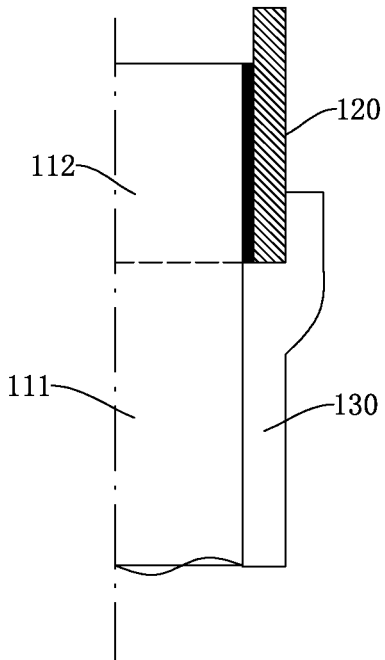
FIG. 18 is a partial cross-sectional view of an electrode assembly provided by another embodiment of the present disclosure.

Please refer to FIGS. 16 to 18 together. FIG. 16 is a partial cross-sectional view of an electrode assembly 100 according to an embodiment of the present disclosure. FIG. 17 is a partial cross-sectional view of an electrode assembly 100 according to another embodiment of the present disclosure. FIG. 18 is a partial cross-sectional view of the electrode assembly 100 according to another embodiment of the present disclosure.

In some optional embodiments, the electrode assembly 100 further includes a second insulating film 130 for being wound around the outer peripheral surface of the electrode body 111. A surface of the second insulating film 130 is provided with adhesive glue, and the second insulating film 130 extends to the outer periphery of the electrode terminal part 112 and not beyond the end face 112a of the electrode terminal part 112.

In these alternative embodiments, the electrode assembly 100 further includes the second insulating film 130. The second insulating film 130 is wound around the outer peripheral surface of the electrode body 111 by the adhesive glue to realize insulation between the electrode body 111 and the housing 200. The second insulating film 130 does not extend beyond the end face 112a of the electrode terminal part 112. That is, a part of the second insulating film 130 with the adhesive glue is beyond the electrode terminal part 112, which can prevent the second insulating film 130 and the end face 112a of the electrode terminal portion 112 from adhering.

There are various relative positions of the second insulating film 130 and the first insulating film 120. For example, as shown in FIG. 16, the second insulating film 130 and the first insulating film 120 abut with each other at a boundary between the electrode terminal part 112 and the electrode body 111. Alternatively as shown in FIG. 17, the second insulating film 130 and the first insulating film 120 abut with each other on the outer peripheral surface of the electrode terminal part 112.

Alternatively in other optional embodiments, as shown in FIG. 18, the second insulating film 130 and the first insulating film 120 are partially laminated. In these optional embodiments, the second insulating film 130 extends to the outer periphery of the electrode terminal part 112 and is partially laminated with the first insulating film 120. The laminated arrangement can ensure that the first insulating film 120 and the second insulating film 130 can wind the whole of electrode unit 110, and there will be no exposed parts on the outer peripheral surface of the electrode unit 110. The second insulating film 130 and the connection part 121 of the first insulating film 120 can provide double protection to the electrode terminal part 112, and a possibility of a short circuit caused by a contact between he electrode assembly 100 and the housing 200 is further reduced.

Those skilled in the art should understand that the above-mentioned embodiments are all exemplary rather than restrictive. Different technical features appearing in different embodiments can be combined to achieve beneficial effects. Those skilled in the art should be able to understand and implement other modified embodiments of the disclosed embodiments on the basis of studying the drawings, description, and claims. In the claims, the term "comprising" does not exclude other means or steps; when an article is not modified with a quantity word, it is intended to include one/one kind or multiple/multiple kinds of articles, and can be used interchangeably with "one/one kind or multiple/multiple kinds of articles"; the terms "first" and "second" are used to indicate names rather than to indicate any specific order. Any reference signs in the claims should not be construed as limiting a protection scope. Functions of multiple parts appearing in the claims can be realized by a single hardware or software module. Certain technical features appearing in different dependent claims do not mean that these technical features cannot be combined to achieve beneficial effects.

What is claimed is:

1. An electrode assembly for a secondary battery, the electrode assembly comprising:

an electrode unit comprising an electrode body and an electrode terminal part electrically connected with the electrode body;

a first insulating film for being wound around the electrode unit, the first insulating film comprising a connection part and an extension part connected with each other, the connection part being provided with an adhesive area for connecting with the electrode terminal part, the extension part being a part of the first insulating film extending beyond an end face of the electrode terminal part, and at least part of the extension part being provided as a non-adhesive area; and a second insulating film for being wound around an outer peripheral surface of the electrode body, a surface of the second insulating film is provided with adhesive glue, and the second insulating film extends to an outer periphery of the electrode terminal part, does not extend beyond the end face of the electrode terminal part, and is laminated on the first insulating film.

2. The electrode assembly of claim 1, wherein the connection part comprises a first portion and a second portion connected with each other, the first portion is used to cover an outer peripheral surface of the electrode terminal part, the second portion is used to cover at least a part of an outer peripheral surface of the electrode body, and each of the first portion and the second portion is provided with the adhesive area.

3. The electrode assembly of claim 1, wherein the second insulating film and the first insulating film abut with each other at a boundary between the electrode terminal part and the electrode body.

4. The electrode assembly of claim 1, wherein the second insulating film and the first insulating film abut with each other on the outer peripheral surface of the electrode terminal part.

* * * * *